United States Patent [19]

Kihara

[11] 3,770,904

[45] *Nov. 6, 1973

[54] MECHANISM FOR ENGAGING A MAGNETIC RECORDING TAPE IN A CASSETTE AND FOR WITHDRAWING THE TAPE FROM THE CASSETTE AND PLACING THE TAPE IN ENGAGEMENT WITH THE GUIDE DRUM OF A MAGNETIC RECORDING AND/OR REPRODUCING APPARATUS

[76] Inventor: Nobutoshi Kihara, 6-3-25 Hatanodai, Tokyo, Japan

[ * ] Notice: The portion of the term of this patent subsequent to July 18, 1989, has been disclaimed.

[22] Filed: Mar. 27, 1972

[21] Appl. No.: 238,284

Related U.S. Application Data

[63] Continuation-in-part of Ser. No. 37,623, May 15, 1970, Pat. No. 3,678,217.

[30] Foreign Application Priority Data

Sept. 22, 1969 Japan .............................. 44/75720
Sept. 22, 1969 Japan .............................. 44/75721
Sept. 22, 1969 Japan .............................. 44/90629

[52] U.S. Cl. ................. 179/100.2 ZA, 179/100.2 T
[51] Int. Cl. ....................... G11b 15/66, G11b 23/04
[58] Field of Search ........... 179/100.2 Z, 100.2 ZA, 179/100.2 T

[56] References Cited

UNITED STATES PATENTS 3,688,059 8/1972 Miura et al. ............... 179/100.2 ZA
3,678,217 7/1972 Kihara ....................... 179/100.2 ZA
3,540,738 11/1970 Yamamoto .................. 179/100.2 Z

*Primary Examiner*—James W. Moffitt
*Assistant Examiner*—Robert S. Tupper
*Attorney*—Lewis H. Eslinger et al.

[57] ABSTRACT

In an apparatus for recording and/or reproducing signals on a magnetic tape wound on reels contained in a cassette having an opening for exposing the tape between the reels, and in which the recording and/or reproducing of signals is effected by a rotary magnetic head moving in a circular path that corresponds with the surface of a tape guide drum mounted on a chassis; a holder is provided on the chassis at a distance from the drum for receiving and positioning the cassette with the opening of the latter facing toward the drum, for example, to engage the reels with a reel driving mechanism, a tape guiding assembly includes at least one finger which is movable from within the opening of a cassette positioned by the holder in a substantially planar path having an arcuate section extending around at least a portion of the circumference of the guide drum for pulling out the tape from the cassette and for wrapping the pulled-out tape about at least such portion of the guide drum circumference, and the tape guiding means and holder are shiftable relative to each other in a direction substantially perpendicular to the plane of the path of movement of the finger between a first relative position, in which the finger is spaced from a cassette received by said holder for avoiding interference by the finger with the reception and positioning of the cassette by the holder, and a second position, in which the finger projects into the cassette opening for engagement with the tape between the reels.

5 Claims, 8 Drawing Figures

MECHANISM FOR ENGAGING A MAGNETIC RECORDING TAPE IN A CASSETTE AND FOR WITHDRAWING THE TAPE FROM THE CASSETTE AND PLACING THE TAPE IN ENGAGEMENT WITH THE GUIDE DRUM OF A MAGNETIC RECORDING AND/OR REPRODUCING APPARATUS

This application is a continuation in part of my pending U.S. Pat. application Ser. No. 37,623, filed May 15, 1970 now U.S. Pat. No. 3,678,217.

This invention relates generally to apparatus for recording and/or reproducing signals on a magnetic tape, and more particularly is directed to improved devices by which, in such apparatus, the magnetic tape wound on reels contained in a cassette can be withdrawn from the cassette and wrapped about a tape guide drum having a rotary recording and/or reproducing magnetic head associated therewith.

Video tape recorders (VTR) have become a popular entertainment and educational media in the past few years. Generally, a VTR comprises one or more rotary magnetic heads which function to record or playback signals on a magnetic tape as the latter is wrapped about a guide drum. The tape is driven by a capstan, pinch roller and a take-up reel which are motor driven, and the motor may also drive the magnetic heads as well as the guide drum.

In order to operate a VTR, the tape must be placed around or wrapped on the drum for guiding the tape with respect to the rotary magnetic heads. Generally, the user must manually thread the tape from a supply reel around various guides on the VTR chassis, around the guide drum and thence back to the take-up reel. This operation requires a considerable degree of manual dexterity and can be time consuming. If the tape is not placed properly, it can jam the machanism and if the operator's fingers have any residue thereon it can be passed to the tape and adversely affect its fidelity.

Further, for simplicity of operation, it is desirable that the magnetic tape be wound on reels contained in a cassette or magazine having an opening through which the tape between the reels may be withdrawn for wrapped engagement with the guide drum, and, in such case, the VTR is provided with a holder by which the cassette is received and positioned, for example, for engagement of its reels with the reel drive mechanism.

Automatic tape loading devices have been suggested in the prior art in order to overcome the aforementioned disadvantages of manual loading or threading of the tape, however, these devices were imperfect in that a great many electrical and mechanical failures occurred. These devices were also unsuccessful because the mechanisms employed to accomplish the desired results are complicated, difficult to manufacture because of their complexity, and expensive. Further, the existing tape loading devices, for example, of the type disclosed in IBM Technical Disclosure Bulletin, Vol. 9, No. 8, January, 1967, at page 968, interfered with the positioning of the cassette by the holder and/or were unreliable in operation by reason of the difficulty experienced in obtaining proper engagement of the tape loading or threading device with the tape within the cassette when positioning the latter on the VTR.

Accordingly, it is an object of this invention to provide a tape recording and/or reproducing apparatus with an automatic tape loading or threading device which does not interfere with the reception and positioning of a cassette by a holder and which is operable to withdraw tape from such cassette and wrap the withdrawn tape about a portion of the guide drum periphery.

In accordance with an aspect of this invention, in an apparatus for recording and/or reproducing signals on a magnetic tape wound on reels contained in a cassette having an opening for exposing the tape between the reels, and in which the recording and/or reproducing of signals is effected by a rotary magnetic head moving in a circular path that corresponds with the surface of a tape drum mounted on a chassis; a holder is provided on the chassis at a distance from the drum for receiving and positioning the cassette with the opening of the latter facing toward the drum, for example, to engage the reels with reel driving mechanism, a tape guiding assembly includes at least one finger which is movable from within the opening of a cassette positioned by the holder in a substantially planar path having an arcuate section extending around at least a portion of the circumference of the guide drum for pulling out the tape from the cassette and for wrapping the pulled-out tape about at least such portion of the guide drum circumference, and the tape guiding means and holder are shiftable relative to each other in a direction substantially perpendicular to the plane of the path of movement of the finger between a first relative position, in which the finger is spaced from a cassette received by said holder for avoiding interference by the finger with the reception and positioning of the cassette by the holder, and a second position, in which the finger projects into the cassette opening for engagement with the tape between reels.

The above, and other objects, features and advantages of the present invention, will become apparent as the following description proceeds, and the features of novelty which characterize the invention will be pointed out with particularity in the claims annexed to and forming part of this specification.

For a better understanding of the present invention, reference may be had to the accompanying drawings in which.

Figure 1:
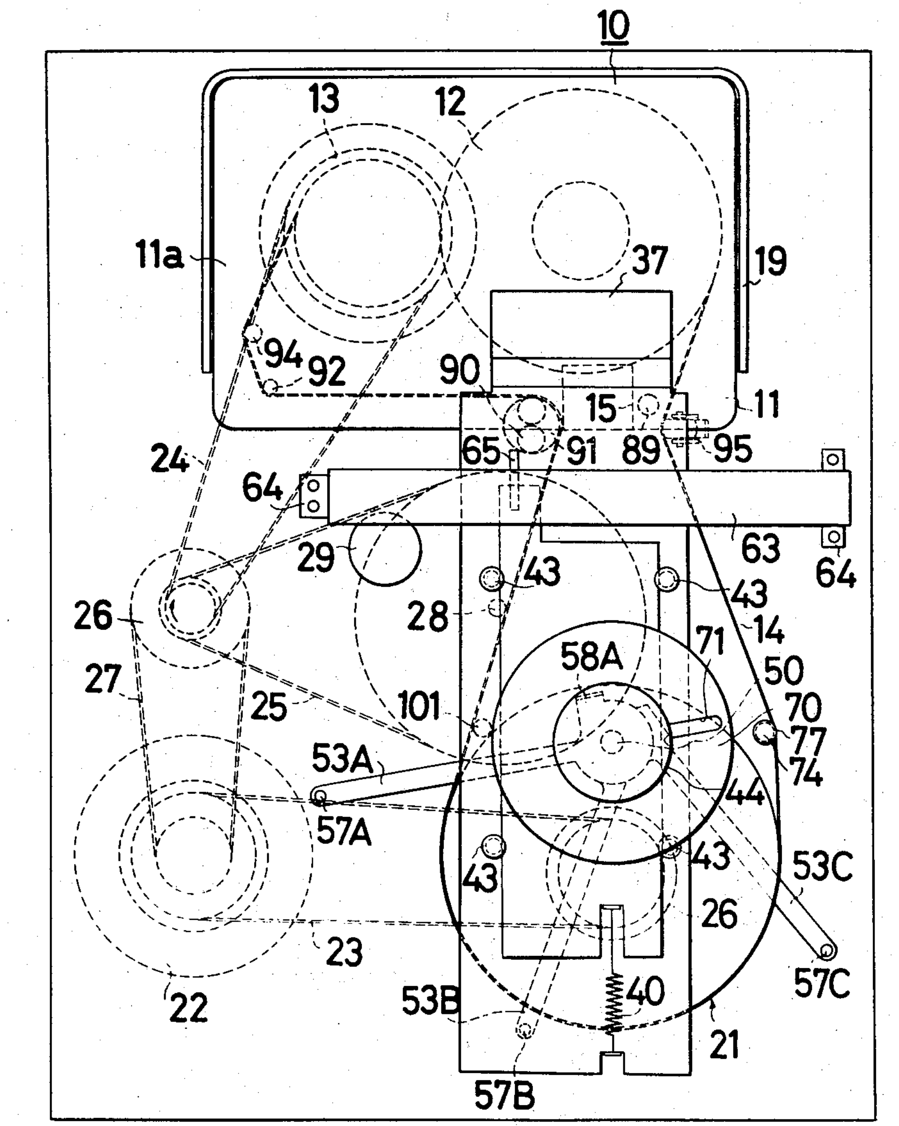
FIG. 1 is a plan view of a video tape recorder having a tape loading device according to this invention and illustrating the drive mechanism and the relationship of the cassette to the chassis of the video tape recorder.

For the purpose of illustrating the present invention, a specific type of video tape recorder is disclosed. It should be understood, however, that the aspects of the present invention are applicable to the many varied tape mechanisms having a suuply and a take-up reel where it is desired to form a loop in the tape. It is not intended to limit the present invention to the specific tape of video tape recorder illustrated.

Referring now to the drawings, there is illustrated a video tape recorder (VTR). A tape cassette generally indicated at 10 can be inserted into the VTR mechanism. The cassette 10 is well known in the art and comprises a housing 11 which contains a pair of tape reels 12 and 13 having a magnetic tape 14 wound thereon. The reel 13 may be considered a take-up reel onto which the tape 14 is wound during reproducing or recording of signals thereon, while the reel 12 is then a supply reel from which the tape is unwound. An opening 15 is formed in the cassette 10 to expose the tape 14 between reels 12 and 13, and opening 15 is sufficiently large that a plurality of fingers, to be described hereinafter, can be inserted into the opening for withdrawing the tape 14 therefrom.

A cassette holder 16 having front and rear abutments 17 and 18 respectively and side walls 19 receives the cassette 10 and positions the latter, for example, for engagement of its reels 12 and 13, from below, by reel drive members (not shown). The holder 16 can be movable, whereby a cassette can be placed in the holder and pivoted into the VTR mechanism, or the holder can be stationary and the cassette can merely be dropped therein.

The video tape recorder chassis is shown generally at 20. Mounted on the chassis 20 is a head drum 21 in which there is provided a rotary magnetic head assembly for reproducing or recording signals on the tape. The drum 21 includes an upper drum 21*a* and a lower drum 21*b* which may be mounted for rotation on a shaft (not shown). Magnetic heads (not shown) are located between the upper and lower drums 21*a*, 21*b* and are fixed to the upper head. The shaft can be driven by any known motor means to rotate the drum 21. For example, as shown in FIG. 1, a motor 22 drives a series of belts 23,24 and 25. The drum 21 has a pulley 26 fixed to the shaft on which drums 21*a* and 21*b* are secured and engaged by the belt 23 so that the latter drives the drum assembly. A known speed reduction mechanism 26 has pulleys thereon which receive the belts 24,25 and 27. The belt 24 drives the reel drive shaft (not shown) engageable with take-up reel 13 and the belt 25 drives a capstan 28. A pinch roller 29 having a soft, rubberized surface thereon is adapted to be moved against the capstan 28 with the tape 14 therebetween so that the tape is frictionally moved by the rotating capstan.

The motor 22 is energized when the tape cassette 10 is placed in the holder 16 to close a switch 30 having electrical connectors 31 thereon electrically connected to the motor 22. A button 32 on the switch extends through an opening 33 in the holder. Thus, when the cassette 10 is placed in the holder 16, the button 32 is actuated and the motor is energized.

The principal feature of this invention is to provide a tape loading device which will engage the tape 14 between the take-up and supply reels 13, 12, and withdraw the tape from the cassette housing 11 and wrap it around the drum assembly 21.

Figure 2:
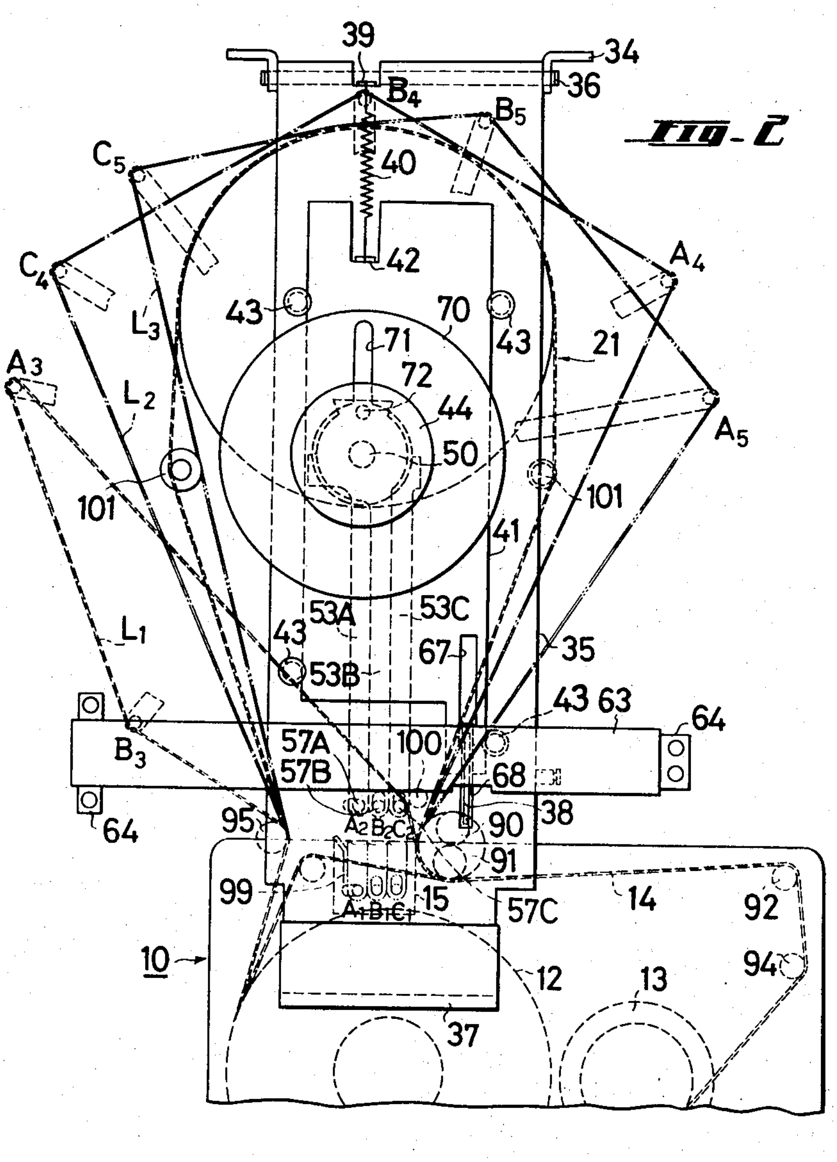
FIG. 2 is a plan view showing the movement of tape guiding fingers of the tape loading device in phantom lines and the various tape positions.
Figure 3:
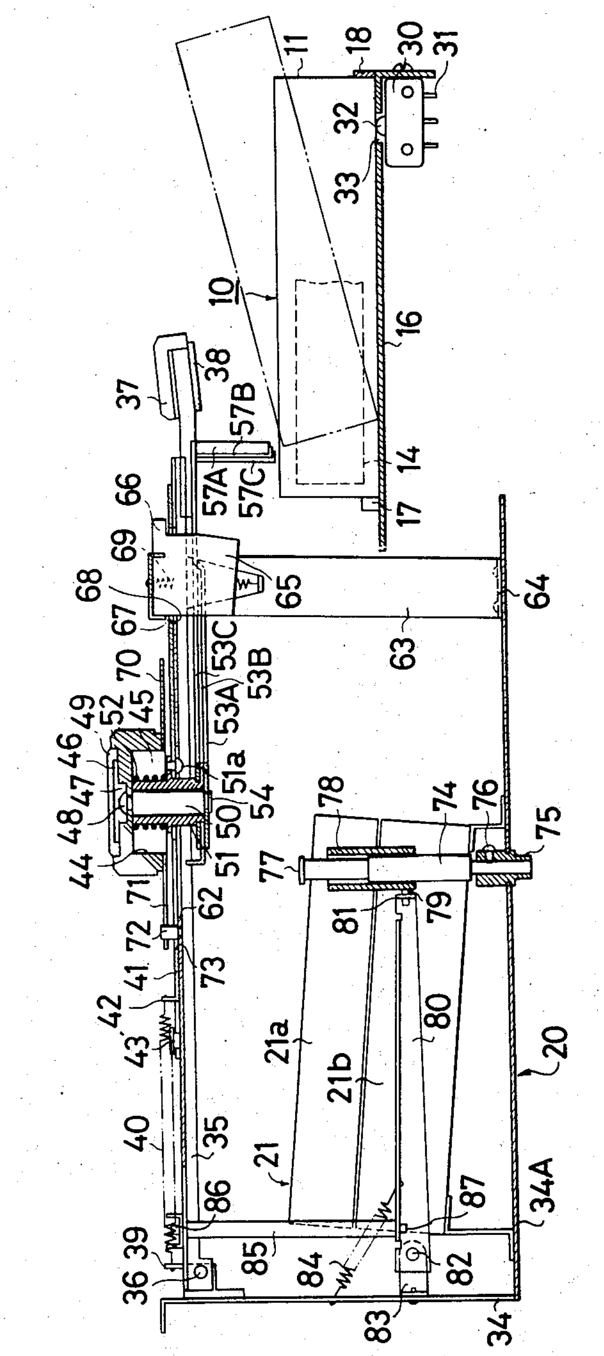
FIG. 3 is a side view, partly in section of the video tape recorder and an illustration of the insertion of a cassette in phantom and full lines.

In FIGS. 2 and 3 there is shown a tiltable support plate 35 having its back end pivotally attached by a pin 36 to an upright wall 34 on the chassis 20. Fixed to the forward end of the plate 35 is a handle 37 having a soft surface 38 thereon such as plastic, rubber or felt to prevent damage to the cassette 10 when the handle is lowered, as will be fully explained hereinafter. An upstanding tab 39 is formed on the pivoted end portion of support plate 35 and a spring 40 is attached to the tab. The other end of spring 40 is attached to a slide member 41 by means of an upstanding tab 42. Thus, the spring 40 biases slide member 41 rearwardly, that is, toward wall 34 of the chassis as shown in FIGS. 2 and 3. In order to insure that the plate 41 moves in a straight path, guide pins 43 are fixed on support plate 35 and lightly engage the side edges of slide member 41. The guide pins 43 are formed with enlarged heads which extend slightly over the slide member 41 thereby preventing it from being displaced upwardly away from the support plate 35.

Figure 6:
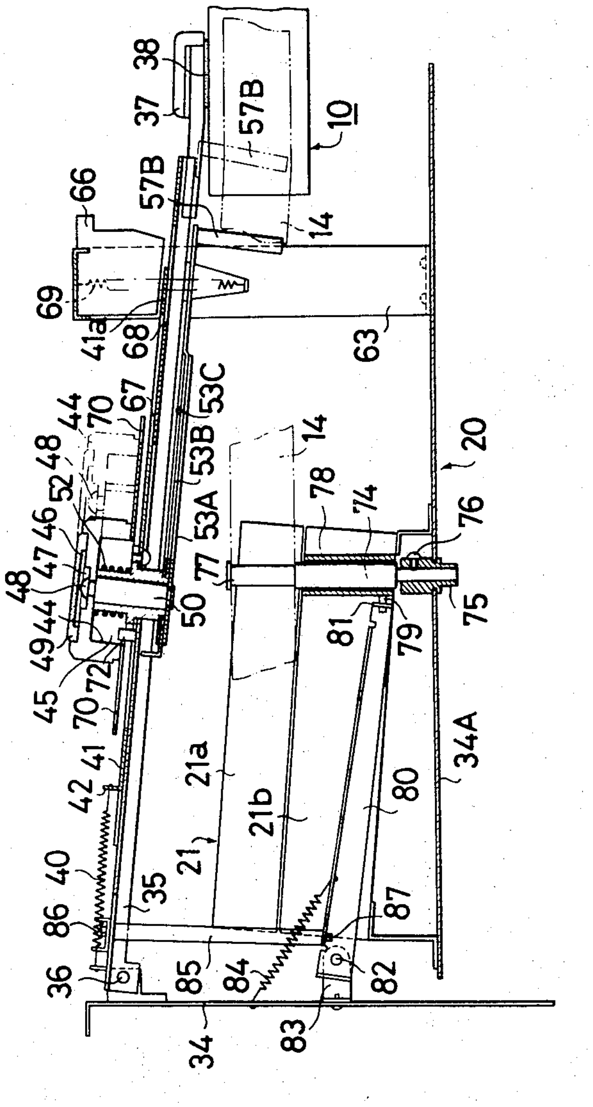
FIG. 6 is a side view of the chassis showing the tape loading device in operative position.
Figure 7:
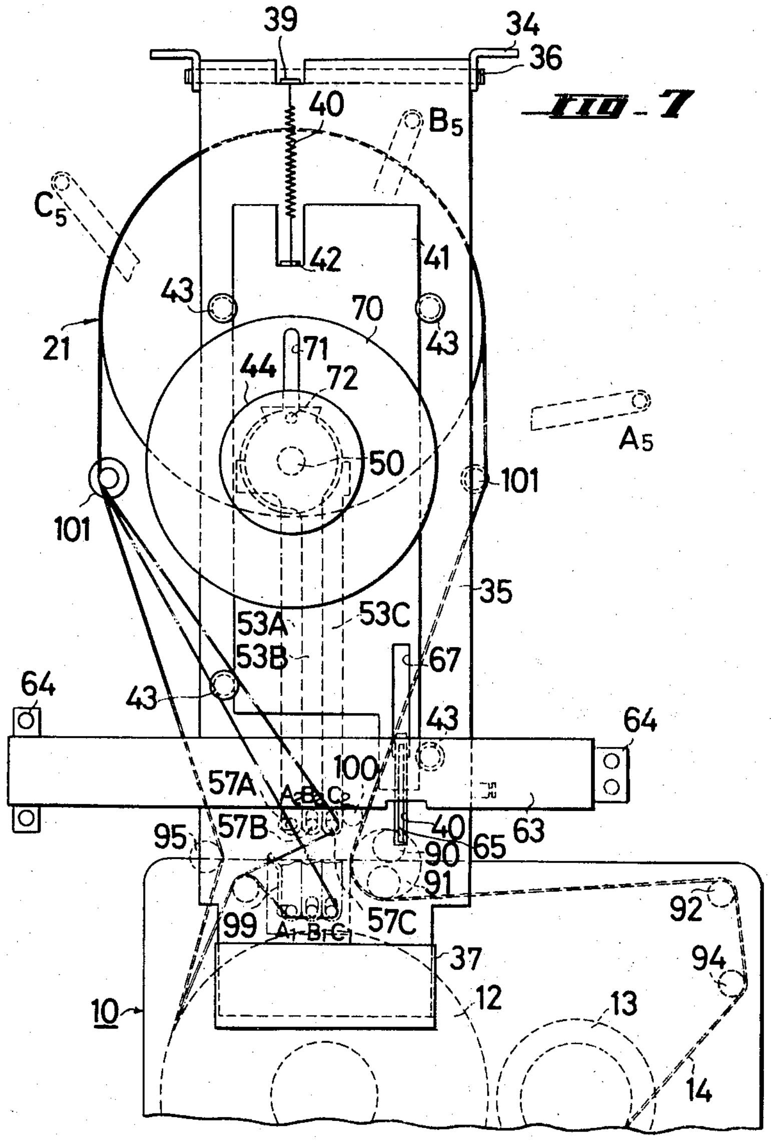
FIG. 7 is a plan view of the tape loading device and its relationship to a cassette.
Figure 8:
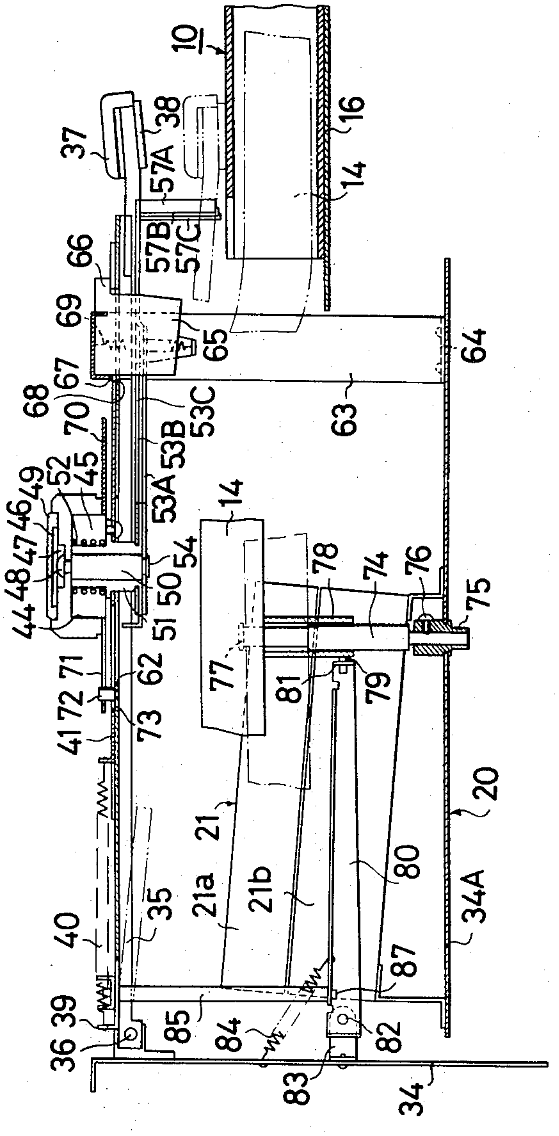
FIG. 8 is a side view of the chassis, partly in section, showing the tape loading device in its non-operative position.

Referring now to FIGS. 3,6 and 8 there is shown a rotatable knob 44 having a downwardly open interior 45. The knob 44 has a recess 46 and a counterbore 47 in the top portion thereof. The counterbore 47 receives a bolt 48 which has its head hidden by a cover 49, and by which the knob is fixed to a rotatable shaft 50 located within a sleeve 51. The sleeve is secured to slide member 41 by any fastening means, such as a rivet 51*a*. A coil spring 52 circumscribes the sleeve 51 and one end of the spring is attached to the non-rotatable sleeve and the other end is fixed to the rotatable knob 44 such that the knob is biased in a clockwise direction with the shaft 50 as viewed on FIGS. 2 and 7.

Figure 4:
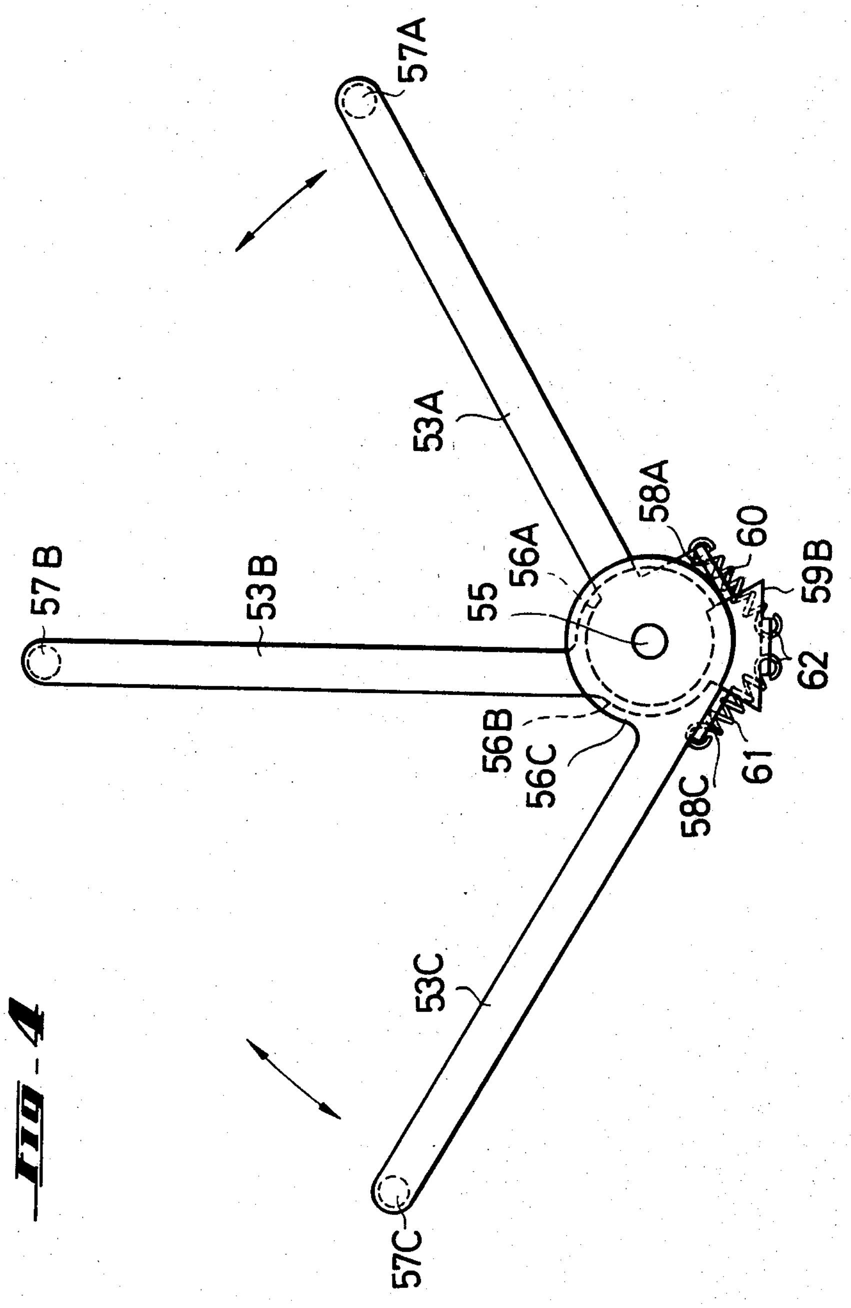
FIG. 4 is an enlarged detail plan view of the tape guiding fingers.

Three arms 53A, 53B and 53C, shown in detail in FIG. 4, are connected to the shaft 50 by a bolt or a rivet 54 which extends through openings 55 in enlarged end portions 56A,56B,56C of the respective arms. Each of arms 53A,53B and 53C has a depending tape guiding finger 57A,57B and 57C secured to its free end. An upstanding tab 58A extends from the enlarged portion 56A of arm 53A and an identical upstanding tab 58C extends from the enlarged portion 56C of arm 53C. An extension 59B formed on the enlarged portion 56B of arm 53B is interposed between the tabs 58A and 58C. Springs 60 and 61 are fixed, at one end, to the upstanding tabs 58A and 58C, respectively, and the opposite ends of the springs are secured to posts 62 on the extension 59B. Thus, arms 53A and 53C are biased in opposite directions away from arm 53A and the engagement of tabs 58A and 58C with extension 59B limits the angular movements of arms 53A and 53C away from arm 53B, for example, to an angular movement of about 40. The rivet 54 secures the arm 53A to the shaft 50, and the arms 53B and 53C are freely rotatable relative to the shaft 30. Thus, when the knob 44 rotates, for example, in a clockwise direction as viewed on FIG. 2, the shaft 50 which is fixed to the knob and to arm 53A rotates the latter.

Formed in support 35 is a guide slot 62 as shown in FIG. 3. A stanchion 63 has flanges 64 riveted or otherwise secured to the chassis bottom plate 34*a*. The stanchion 63 is an inverted U-shaped member having bight portion which extends beyond the width of the plate 35 and slide member 41. A locking member 65, seen best in FIGS. 6 and 8, is secured to or formed integrally with the stanchion 63. The locking member is a plate having a forwardly protruding finger 66 thereon. A longitudinal slot 67 is formed in slide member 41 and the locking member 65 is extendable through the longitudinal slot 67 (FIG. 8). The locking member 65 is also extendable through another longitudinal slot 68 formed in support plate 35. The slots 67 and 68 register or are in alignment when the slide member 41 is moved forwardly against the force of spring 40 to a predetermined position relative to support plate 35.

A coil spring 69 is fixed to stanchion 63 at its bight portion and the opposite end of the spring is fixed to support plate 35 so as to urge the plate upwardly about pin 36 to the raised position shown on FIGS. 3 and 8. Thus, since the handle 37 is fixed to the plate 35, downward pressure on the handle will pivot the plate 35 downwardly around the pin 36, for example, to the lowered position shown in FIG. 6.

A radially extending flange 70 is fixed to the depending skirt of rotatable knob 44. A radial slot 71 opens at the inner edge of the flange 70 and extends to a point near the outer periphery of the flange. A protuberance 72 is attached to support plate 35 and is dimensioned to extend upwardly through the radial slot 71 when slide member 41 is displaced forwardly from its rearmost position relative to support plate 35 shown on FIG. 6. Thus, protuberance 72 prevents rotation of knob 44 except when slide member 41 is in its rearmost position. A longitudinal slot 73 is provided in slide member 41 in alignment with the protuberance 72 to permit the protuberance to extend through such slot 73 for engagement in slot 71. The aforementioned structure comprises the tape loading subassembly. The following structure comprises the unloading subassembly for removing the tape 14 from the drum 21 so the cassette 10 can be removed from the holder 16 on chassis 20.

A post 74 is rigidly fixed to the bottom chassis wall 34*a*, as by a sleeve 75 and a set screw 76. The post 74 has an enlarged head 77 thereon which is adapted to extend over the edge of the tape 14 and help maintain the tape in contact with the drum 21 after a tape loading operation. An unloader sleeve 78 is slidably mounted on post 74, and carries a pin 79 engaging in an opening (not shown) provided in a flange 81 at one end of an arm 80. The arm 80 is free to tilt about a pin 82 which is secured to an L-shaped bracket 83 fastened to the wall 34 of chassis 20. The arm 80 is biased upwardly about the pin 82 by a spring 84 having one end connected to a wall 34 of the chassis and the other end fixed to the arm 80. A connecting rod 85 has its upper end 86 secured to the loader plate 35 and its other lower end 87 engaged with the arm 80. It will now be readily understood that, when the plate 35 is in its raised, horizontal locked position shown in FIGS. 3 and 8, the arm 80, since it is coupled to the plate 35 via the rod 85, is also raised by spring 84 to a horizontal position parallel to the plate 35. When the plate 35 is lowered as shown in FIG. 6, the arm 80 is similarly tilted downwardly about the pin 82 and remain in substantially parallel relationship with the plate 35. It will also be seen that the sleeve 78 will move up and down along the post 74 since it is connected to the movable arm 80. The post 74 is located adjacent the drum 21 such that the sleeve 78 is engageable from below with the tape 14 engaged with post 74 and when the sleeve 78 is moved upwardly it functions to force the tape 14 upwardly out of contact with post 74 and off the peripheral surface of the drum.

Figure 5:
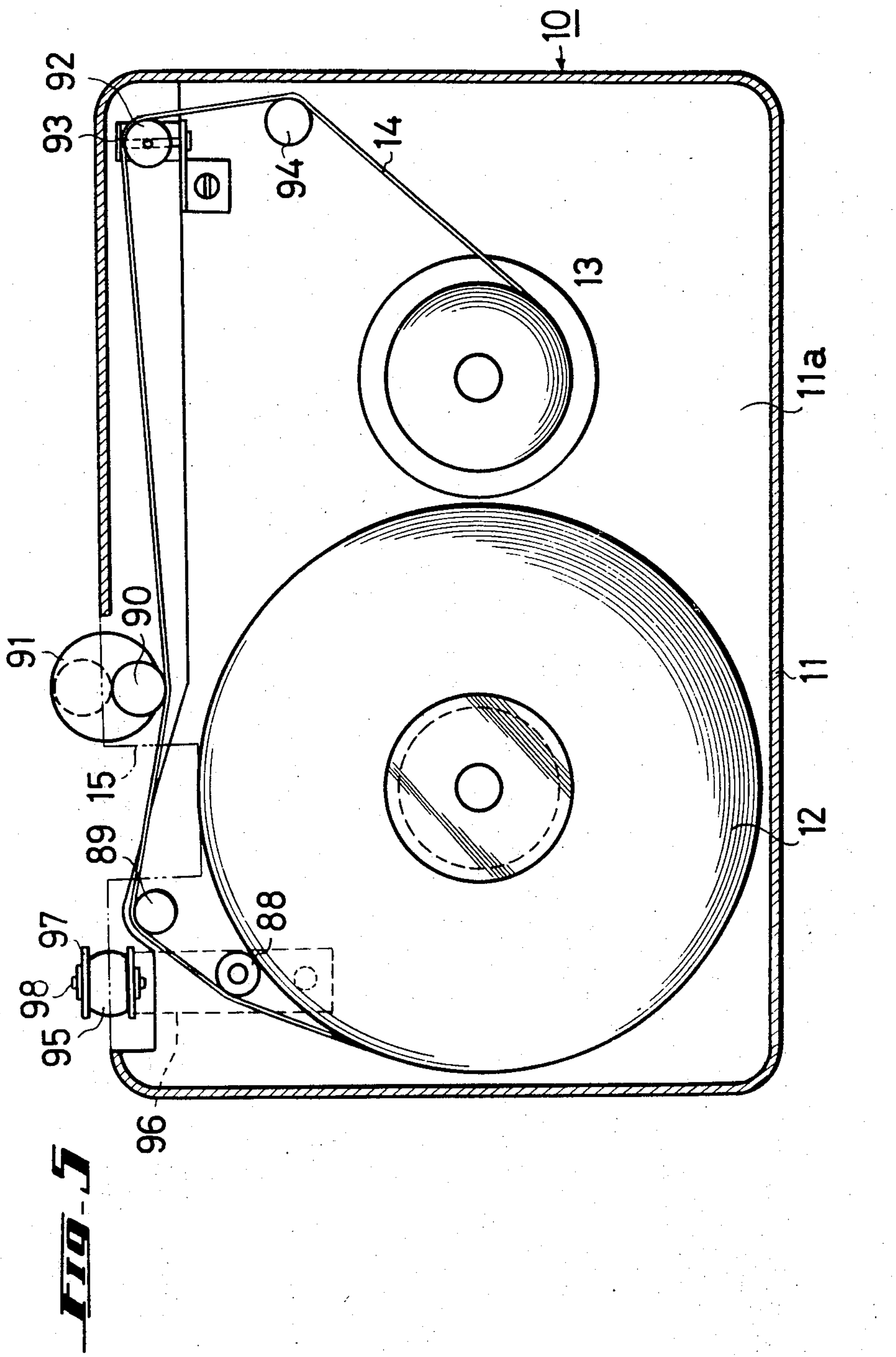
FIG. 5 is a plan view, partly in section, of a cassette cartridge.

Referring to FIG. 5, it will be seen that the housing 11 of cassette 10 which is preferably formed of plastic has its upper and lower parallel walls 11*a* connected by a peripheral wall, and that the take-up reel 13 and supply reel 12 are spaced from each other within housing 11 with the magnetic tape 14 being guided from reel 12 to reel 13 by means of posts 88 and 89, a roller 92 on a bracket 93 and a post 94, all disposed within housing 11, so that a run of the tape 14 normally extends across and is exposed at the cassette opening 15. Further, as shown, a guide roller 95 is rotatable on a shaft 98 carried by ears 97 of a bracket 96 which is suitably mounted on the chassis so as to be disposed adjacent one side of the cassette opening 15 when the cassette 10 is positioned by the holder 16, and a guide post 90 is carried by a support 91 which is also suitably mounted on the chassis so as to extend upwardly into the cassette housing 11 at the opposite side of cassette opening 15 when cassette 10 is positioned by holder 16. Further, as shown on FIGS. 1,2 and 7, tape guides 101 may be provided on the chassis 20 so as to be engageable by the tape 14 for guiding the latter between the cassette 10 and the drum 21 after the tape has been loaded or wrapped about the guide drum.

The tape loading device of the recording and/or reproducing apparatus described above operates as follows:

Initially, support plate 35 is maintained in its raised or elevated position (FIG. 3) by the force of spring 69, with the upward movement of support plate 35 being limited by finger 66 on locking member 65. Further, in such initial position, slide member 41 is displaced forwardly relative to support plate 35 against the force of spring 40 and is held in such relative forward position by the engagement of locking member 65 in slot 67 of slide member 41. With slide member 41 in its relatively forward position with respect to support plate 35, protuberance 72 on support plate 35 is engaged in radial slot 71 of flange 70 and thus holds knob 44 against rotation by spring 52. So long as protuberance 72 is engaged in slot 71, arm 53A which is fixed to shaft 50, and hence to knob 44, extends forwardly from shaft 50 and holds the arms 53A, 53B and 53C close together against a stop pin 100 (FIG. 2) against the forces of springs 60 and 61 tending to spread the arms angularly away from each other to the positions shown on FIG. 4.

With support plate 35 in its elevated position and slide member 41 held in its forward position relative to support plate 35, fingers 57A,57B and 57C depending from the free ends of arms 53A,53B and 53C are spaced upwardly from holder 16. Thus, cassette 10 can be conveniently inserted onto holder 16, for example, from the position shown in broken lines to the position shown in full lines on FIG. 3, without interference from the fingers 57A,57B and 57C. When the cassette 10 has been positioned by holder 16, for example, so as to engage its reels 12 and 13 from below by the corresponding reel drive shafts, the cassette depresses actuating button 32 of switch 30 and thereby conditions the usual electrical circuits associated with motor 22 for operation of the latter. When motor 22 is operated, the rotation of its shaft is transmitted through belt 23 and pulley 26 to rotate the magnetic heads associated with drum 21, and through belt 27 and speed changer 26 to drive belts 24 and 25 for effecting rotation of the reel drive shaft associated with take-up reel 13 and of capstan 28.

In order to initiate the tape loading operation following the positioning of cassette 10 by holder 16, the operator depresses handle 37 and thereby downwardly tilts support plate 35 for moving the latter against the force of spring 69 to the depressed position shown on FIG. 6. During the downward tilting of support plate 35 to its depressed position, fingers 57A,57B and 57C, being closely grouped together,move downwardly into the opening 15 of cassette housing 11 so as to extend in front of the run of the magnetic tape 14 which is exposed at such opening 15, for example, as at $A_1$,$B_1$ and $C_1$ on FIG. 2. If desired, a guide member 99 may be provided, if desired, to guide the fingers during the insertion of the latter from above into the cassette housing.

As support plate 35 is tilted downwardly by depressing of handle 37, slot 67 in slide member 41 is freed from locking member 65, as shown on FIG. 6, whereby spring 40 is then able to move slide member 41 rearwardly relative to support plate 35 to the position shown in full lines on FIG. 6. Since knob 44, shaft 50 and arms 53A,53B and 53C are all mounted on slide member 41, such elements are also moved rearwardly with slide member 41 and, accordingly, fingers 57A,57B and 57C engaging in front of the tape 14 pull the tape rearwardly out of the cassette opening 15 during the movement of the fingers to the positions indicated at $A_2$,$B_2$ and $C_2$ on FIG. 2. During such rearward movement of the tape engaging fingers, the latter remain close together by reason of the engagement of protuberance 72 in slot 71. However, at the termination of the rearward movement of slide member 41 relative to support plate 35, protuberance 72 is freed from slot 71 in flange 70 and enters the hollow interior 45 of knob 44 so that the latter is free to be rotated by spring 52 in the clockwise direction, as viewed in FIG. 2. Since arm 53A is fixed to shaft 50, arm 53A rotates in the clockwise direction with knob 44 independently of arms 53B and 53C until such time as lug 58A contacts extension 59B, whereupon arm 53B follows the rotation of arm 57A with the predetermined angular spacing therebetween. Finally, when extension 59B engages lug 58C, arm 53C turns with arms 53A and 53B with the arms being angularly spaced from each other as shown on FIG. 4. Thus, in response to the clockwise rotation of knob 44 under the urging of spring 52, the tape engaging fingers move successively from the positions indicated at $A_2$,$B_2$ and $C_2$ through the positions indicated at $A_3$,$B_3$ and $C_2$, at $A_4$,$B_4$ and $C_4$, and at $A_5$,$B_5$ and $C_5$, so as to form the withdrawn tape into respective loops $L_1$, $L_2$ and $L_3$ (FIG. 2). It will be noted that the tape loops indicated at $L_2$ and $L_3$ are disposed above the guide drum 21 and encompass the latter with all portions of such tape loops being spaced outwardly from the peripheral surface of the guide drum. Further, during the movement of the tape engaging fingers from the positions indicated at $A_4$,$B_4$ and $C_4$ to the positions indicated at $A_5$,$B_5$ and $C_5$, the tension in the tape is reduced, that is, the aggregate distance between reels 12 and 13 and circumscribing the tape engaging fingers is finally reduced to create slack in the tape loop $L_3$, so that the tape loop $L_3$ falls under the influence of gravity from the tape engaging fingers and engages around the tape guide drum 21 with the surface of the tape at the inside of the loop $L_3$ being engageable with at least a portion of the peripheral surface of the guide drum. If desired, the tape guiding or engaging fingers 57A, 57B and 57C, or at least some of those fingers, may be tapered downwardly to facilitate the release of the tape therefrom, as described above. Following the release of the tape loop $L_3$ from the tape guiding or engaging fingers, the rotation of take-up reel 13 takes up the slack in the tape 14 between reels 12 and 13 so as to engage the tape closely about the peripheral surface of guide drum 21, and the pinch roller 29 is then moved toward capstan 28 for engaging the tape therebetween and thereby effecting controlled drive of the tape by the rotated capstan.

Thus, the tape has been properly loaded or wrapped about guide drum 21 for the recording or reproducing of singnals thereon by the rotary heads associated with the guide drum. It will be seen that, when support plate 35 is depressed and slide member 41 is moved rearwardly relative thereto by spring 40 during the above described tape loading operation, a forward end portion 41*a* of the slide member 41 is brought under the lower edge of locking member 65 (FIG. 6) and thereby holds support plate 35 in its depressed position against the force of spring 69. With support plate 35 in that depressed position, the handle 37 at the forward end of support plate 35 bears downwardly upon cassette 10 positioned by holder 16, and thereby prevents inadvertent removal of the cassette from the holder 16 during the recording or reproducing operation of the apparatus.

When a recording or reproducing operation of the apparatus is completed and the operator desires to remove the cassette 10 from its holder 16, the knob 44 is rotated in the counter-clockwise direction, as viewed on FIG. 2, against the force of spring 52, whereby the fingers 57A, 57B and 57C are returned to the positions indicated at $A_2$,$B_2$ and $C_2$ on FIG. 7. Then, the knob 44 is pulled forwardly to similarly displace slide member 41 against the force of spring 40, whereby the tape engaging fingers are moved to the positions indicated at $A_1$,$B_1$ and $C_1$ on FIG. 7 and the slot 67 in plate 41 is brought into registration with the locking member 65 which can then enter the slot 67 to permit upward tilting of support plate 35 back to its elevated position under the influence of spring 69. As support plate 35 is tilted upwardly by spring 69 to its elevated position, rod 85 permits spring 84 to similarly tilt arm 80 in the upward direction so that sleeve 78 is displaced upwardly on post 74. During such upward displacement of sleeve 78, the upper end edge of the sleeve acts upon the magnetic tape 14 to propel the latter upwardly past head 77 and off post 74, as illustrated on FIG. 8. It will be apparent that, during the unloading of the tape 14 from about drum 21, the latter continues to be rotated by the operation of motor 22, and such continued rotation of the drum cooperates with the upward lifting of the tape by sleeve 78 so as to strip the tape upwardly off the guide drum. Since the take-up reel 13 is also rotated during the tape unloading operation, the slack tape loop created when the tape is stripped upwardly off guide drum 20 is fully drawn into the cassette by winding of the slack tape onto the take-up reel. With the tape 14 again fully contained within the housing 11 of cassette 10, and with the tape guiding or engaging fingers 57A,57B and 57C returned to their elevated positions above the cassette, as shown on FIG. 8, the cassette can now be conveniently removed from holder 16, and in response to such removal of the cassette from the holder, the switch 30 again opens to halt the operation of motor 22.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of this invention.

What is claimed is:

1. An apparatus for recording and/or reproducing signals on a magnetic tape wound on reels contained in a cassette which has an opening for exposing the tape between the reels; comprising a chassis, a tape guide drum mounted on said chassis and having at least one rotary magnetic head associated therewith for movement in a circular path corresponding to the surface of said drum, a holder on said chassis spaced from said drum for receiving and positioning a cassette with said opening thereof facing toward said drum, tape guiding means having at least one finger directed substantially parallel to the axes of said reels when said cassette is positioned by said holder, said finger being movable from within said opening of a cassette positioned by said holder in a substantially planar path having an arcuate section extending around at least a portion of the circumference of said guide drum for pulling out the tape from the cassette and for engaging the pulled-out tape with at least said portion of the circumference of said guide drum, and means for shifting said tape guiding means and said holder relative to each other in a direction substantially perpendicular to the plane of said path of movement of the finger between a first relative position, in which said finger is spaced from a cassette received by said holder for avoiding interference by said finger with the reception and positioning of said cassette by said holder, and a second position, in which said finger projects into said opening of the cassette positioned by the holder for engagement with the tape between said reels.

2. An apparatus according to claim 1; in which said holder is fixedly positioned with respect to said chassis, and said tape guiding means further includes support means carrying said finger and being movable relative to said chassis in said direction perpendicular to said plane of the path of movement of said finger for permitting said relative shifting of said tape guiding means and holder between said first and second relative positions.

3. An apparatus for recording and/or reproducing signals on a magnetic tape wound on reels contained in a cassette which has an opening for exposing the tape between the reels; comprising a chassis, a holder on said chassis for receiving and positioning a cassette, a tape guide drum spaced from said holder on said chassis and having at least one rotary magnetic head associated therewith for movement in a circular path corresponding to the circumference of said drum, tape guiding means including a plurality of fingers extendable into said opening of a cassette recieved by said holder and being movable out of said cassette opening in a substantially planar path that is disposed above said guide drum and has an arcuate section extending around at least a portion of the circumference of said drum for pulling out the tape from said opening of the cassette received by said holder and for forming the pulled-out tape into a loop that is disposed above the guide drum and that encompasses and is spaced outwardly from said drum, means for releasing the tape loop from said tape guiding means so that the tape loop drops from said fingers around said drum and the surface of the tape at the inside of said loop is engageable with at least said portion of said circumference of the guide drum, and means for shifting said tape guiding means and said holder relative to each other in a direction substantially perpendicular to the plane of said path of movement of the fingers between a first relative position, in which said fingers are disposed above a cassette received by said holder, and a second relative position, in which said fingers project from above into the cassette opening for engagement with the tape between the reels.

4. An apparatus according to claim 3, in which said fingers depend from mounting means therefor which include a tiltable support plate pivoted on said chassis to move between an elevated position in which said fingers are raised above a cassette received by said holder and a depressed position in which said fingers project downwardly into said opening of the cassette positioned by said holder.

5. An apparatus for recording and/or reproducing signals on a magnetic tape wound on reels contained in a cassette which has an opening for exposing the tape between the reels; comprising a chassis, a tape guide drum mounted on said chassis with its axis at a substantial angle from the horizontal and having at least one rotary magnetic head associated therewith for movement in a circular path corresponding to the surface of said drum, a holder on said chassis spaced in the horizontal direction from said drum for receiving and positioning a cassette with said opening thereof facing toward said drum and with the axes of the reels extending substantially vertically, tape guiding means having at least one substantially vertical finger movable from within said opening of a cassette positioned by said holder in a substantially planar path having an arcuate section extending around at least a portion of the circumference of said guide drum for pulling out the tape from the cassette and for engaging the pulled-out tape with at least said portion of the circumference of said guide drum, and means for shifting said finger of the tape guiding means and said holder substantially vertically relative to each other between a first relative position, in which said finger is spaced from a cassette received by said holder for avoiding interference by said finger with the reception and positioning of said cassette by said holder, and a second position, in which said finger projects into said opening of the cassette positioned by the holder for engagement with the tape between said reels.

* * * * *